March 15, 1949.　　　　　A. RAVA　　　　　2,464,528
APPARATUS FOR WELDING
Filed June 20, 1946　　　　　　　　　　2 Sheets-Sheet 1
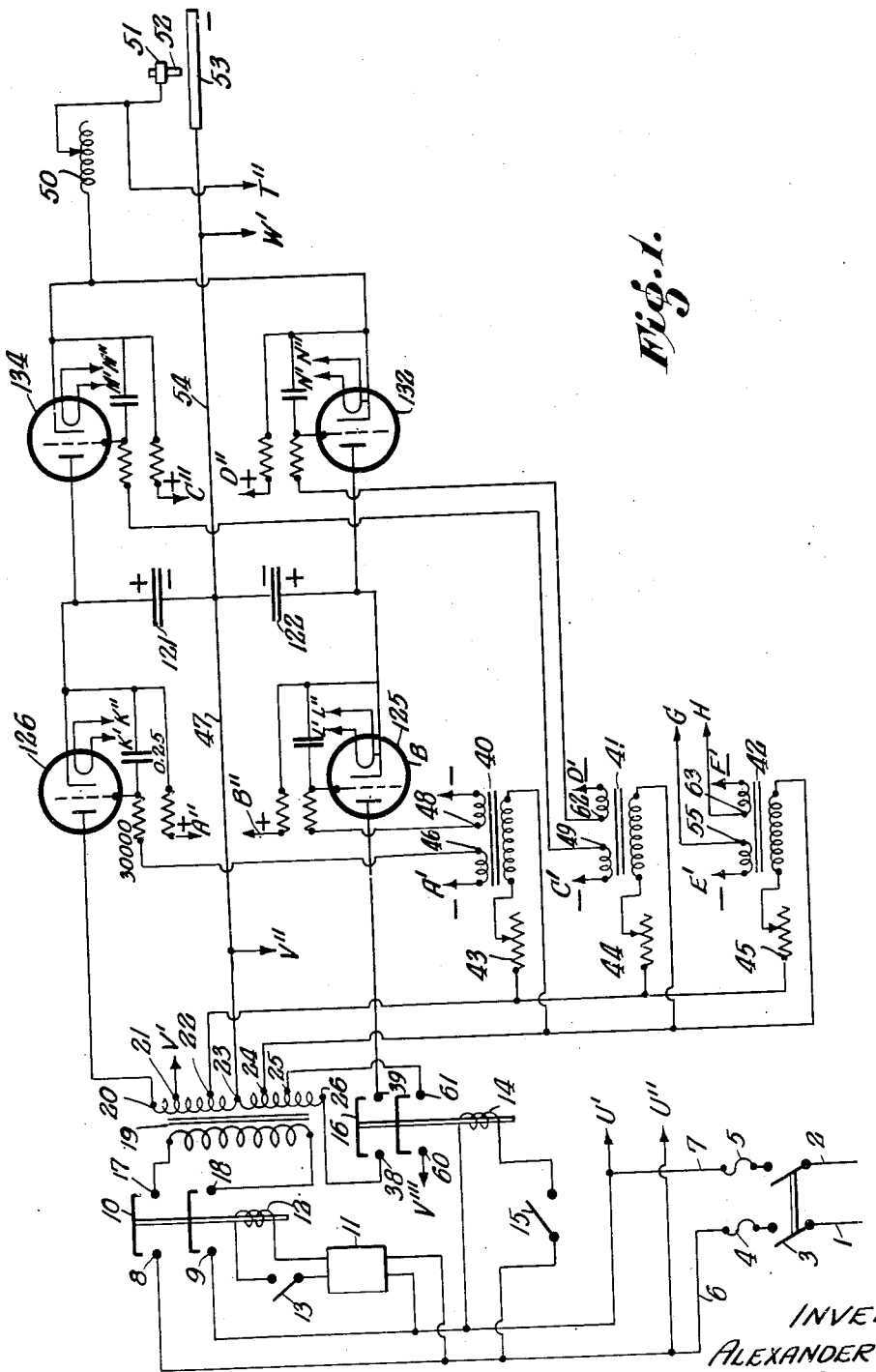
INVENTOR:
ALEXANDER RAVA,
BY Darby & Darby
ATTORNEYS March 15, 1949.　　　　A. RAVA　　　　2,464,528
APPARATUS FOR WELDING
Filed June 20, 1946　　　　　　　　　　　2 Sheets-Sheet 2
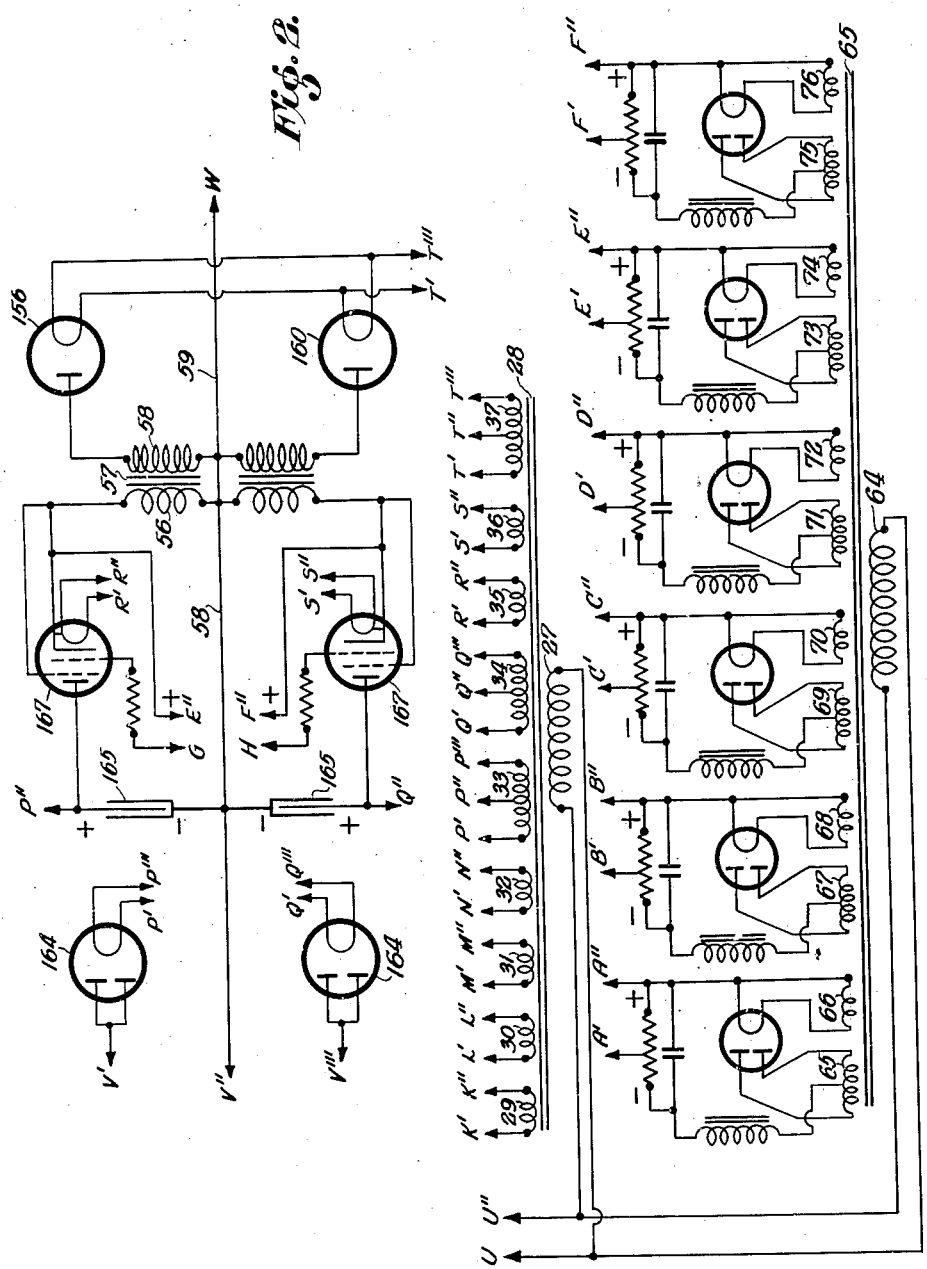
INVENTOR:
ALEXANDER RAVA
BY Darby & Darby
ATTORNEYS Patented Mar. 15, 1949

2,464,528

UNITED STATES PATENT OFFICE 2,464,528

APPARATUS FOR WELDING

Alexander Rava, Jersey City, N. J.

Application June 20, 1946, Serial No. 677,963

7 Claims. (Cl. 219—8)

In my United States Patent No. 2,235,385, issued March 18, 1941, for "Welding method and apparatus," I have disclosed a structure and method which involves the storage of electrical energy in a capacitor and the release of that energy in a surge through an arc gap to perform an arc welding operation. Coincidentally, energy is stored in another condenser and a capacitative surge from that condenser at high voltage is released across the arc gap with that surge for the purpose of ionizing the gap.

Figure 4 of said patent, No. 2,235,385, shows a system in which two capacitors (or sets of capacitors) are used for operation of both half cycles of an alternating current supply.

The present invention relates to improvements on the apparatus shown in said patent and I have chosen to illustrate my invention by applying it specifically in the drawings to the type of circuit shown in Figure 4 of said patent.

The object of the present invention is to provide an improved apparatus for welding with a capacitative surge of energy through an ionized gap.

A feature of the present invention is the use of a power transformer from whose secondary is derived all the voltages for timing the operation of the system in proper sequence, thereby avoiding the use of expensive phase shifters operating from a three phase supply.

Another feature of my invention is that it utilizes only a single phase of alternating current and, therefore, a machine built in accordance with my invention may be used only where single phase is present. The machine itself may be made more cheaply and will be more efficient and its operation will be surer for the reason that it is not subjected to variations in the phase of currents used due to other factors such, for example, as the operation of other electrical machines in the same factory where one of my machines may be used.

Another feature of my invention is the provision of means for very simply converting my full cycle machine to a half cycle machine when required.

In the drawings—

Figure 1 is a circuit diagram illustrating a portion of my new apparatus; and

Figure 2 is a circuit diagram illustrating the remainder of my apparatus.

It will be understood that Figures 1 and 2 join as will be indicated below and constitute a single circuit which will be built into a single physical piece of apparatus.

For convenience in relating the circuit of the present invention to the circuit of Figure 4 of my patent, No. 2,235,385, I have used the same reference numerals to designate corresponding tubes and capacitors.

In the drawings, all the reference letters which are the same indicate points in the circuit which are connected together. This system has been used for simplicity in order to make the circuit easier to follow.

In Figure 1 a power line 1, 2 supplies power through a switch 3 and fuses 4, 5 to a pair of leads 6, 7 which are respectively the points U' and U'' in my circuit. The leads 6 and 7 also terminate in switch points 8 and 9 of an electromagnetic double pole single throw contactor 10. The leads 6 and 7 also go to a time delay relay 11 which, after a time interval, will energize a relay 12 which operates the contactor 10 provided the switch 13 is closed.

The switch 13 is the operating switch for the machine which may be either hand or foot operated and will be closed by the operator each time it is desired to perform a welding operation, it being understood that by a welding operation is meant one or more welds.

Also connected across the leads 6 and 7 through a switch 15 is the operating electromagnet 14 for the double pole single throw contactor 16 which serves the purpose of converting the machine into a full wave machine when the switch 15 is closed.

The contactor 10 also has switch points 17 and 18 so that when the magnet 12 operates to operate the contactor 10, point 8 is connected to point 17, and point 9 to point 18, thus completing a circuit through the primary of the single phase power transformer 19. The secondary of the transformer 19 has seven leads tapped therefrom from points which are marked respectively 20, 21, 22, 23, the center tap, 24, 25 and 26. Each half of the secondary is designed to provide full operating voltage for the respective half cycle operating tubes. In a typical machine the voltage from 23 to 22 will be of the order of 110 volts, from 23 to 21 of the order of 220 volts, and from 23 to 20 of the order of 440 volts. If higher voltages are employed the taps 22 and 21 will still have the voltages mentioned while the tap 20 will have the higher voltage. Similarly, the taps on the other side of the mid-point will have corresponding voltages, that is, tap 24 the same as 22, 25 the same as 21, and 26 the same as 20, all these voltages being with respect to the midpoint.

When the switch 3 is closed it will be noted that a circuit is completed from the points U' and U" through the primary 27 of transformer 28, Figure 2, which is provided with nine secondary windings individually insulated which are marked 29 to 37. These secondaries supply the filaments or heaters of the tubes used in the circuit as is indicated by the reference letters connected to the terminals of the secondaries and to the terminals of the filaments and heaters of the various tubes. The time delay relay 11 prevents anode voltages being supplied to the tubes before the cathodes are thoroughly heated in the event the switch 13 should be closed at the time the switch 3 is closed.

Closing the switch 13 energizes the magnet 12, operating the contactor 10 and closing the circuit through the primary of the transformer 19, thus applying anode voltage to the tube 126 and, if the switch 15 is also closed, applying anode voltage to the tube 125 through the contact points 38 and 39. The tubes 125 and 126 will not conduct current except when their grids are suitably biased for this purpose. A negative bias is maintained upon the grid of tube 126 by the rectified voltage between points A' and A" of Figure 2, which points are connected across the points A' and A" of Figure 1. A negative bias is similarly applied to the grid of tube 125 by the rectified voltage across the points B' and B", Figure 2, which are connected to the points B' and B", Figure 1.

Connected across the points 22 and 24 on the secondary of transformer 19 are the three peaking transformers 40, 41 and 42, the primaries of which are in series respectively with the adjustable resistances 43, 44 and 45 which may have a maximum value of from 3000 to 4000 ohms and which are adjusted for the purpose of adjusting the phase of operation of the peaking transformers.

These peaking transformers of the general type I contemplate using are disclosed in the General Electric review for June 1934, volume 37, No. 6, at pages 288–295 and are particularly shown in schematic in Figure 16 of page 293 and in physical structure in Figure 17 of page 294. The specific type of peaking transformer I prefer to use is shown in a paper by O. Kiltie entitled "Transformers with peak waves" in Electrical Engineering for November 1932, volume 51, at pages 802–804. The use of such peaking transformers to control the firing of thyratron type tubes is shown in the book entitled "Electronic Control of Resistance Welding" by George M. Chute, published by McGraw-Hill Book Company, Inc., in 1943. Chute discusses the use of peaking transformers at pages 231 and 232 and shows the shifting of the secondary peaking voltage in respect to the line voltage at page 186 in connection with a peaking transformer whose primary is illustrated at page 183 and whose secondary is illustrated at pages 185.

Accordingly, in time relation which is determined by the adjustment of resistance 43 a positive peak of voltage will appear at point 46 on the secondary of transformer 40 which positive voltage will be applied to the grid of tube 126, overcoming the negative bias above referred to and causing the tube to pass current to charge the condenser 121, the circuit being from point 20 through tube 126, condenser 121 and lead 47 back to point 23. At the same time tube 125 is prevented from passing current because at the time the positive peak appears at point 46 a negative peak will appear at point 48 on the secondary of transformer 40 and will be added to the negative bias already on the grid of tube 125 which is above referred to.

Tube 134 has a constant negative bias applied to its grid from the points C' and C", Figure 2, which are connected across the points C' and C", Figure 1. At the end of the half cycle of voltage on the secondary of transformer 19 during which the tube 126 has fired, a positive peak of voltage will appear at point 49 on the secondary of peaking transformer 41 and will be applied to the grid of tube 134 to overcome the negative bias above referred to. Tube 134 will accordingly pass current to discharge the condenser 121 through the adjustable inductance 50, through the electrode holder 51 and electrode 52 and through the welding table 53, the circuit being completed through the lead 54 back to the capacitor 121, provided the gap between 52 and 53 is ionized to permit the passage of this current since generally the voltage of the charged condenser 121 is insufficient to bridge the gap. The gap will be ionized at the time of the discharge of condenser 121 by reason of the simultaneous or slightly preceding discharge of condenser 165 through the same gap as will now be explained.

As before explained, the filaments or cathodes of the tubes 164, 167, and 156 are heated from the secondaries of transformer 28. A negative bias is maintained upon the grid of tube 167 by the voltage across points E' and E" at the lower portion of Figure 2, which are connected respectively to the point E" at the upper part of Figure 2 and point E' on the secondary of transformer 42, Figure 1, so that tube 167 will not pass current until this negative bias is overcome by a peak of positive voltage at the point 55 on the secondary of transformer 42.

It will be noted that the anodes of tube 164 are connected to the point B' which is connected to the tap 21 on the secondary of transformer 19, being usually 220 volts in respect to the mid-tap 23. When the positive half cycle of voltage is at a peak at point 20 on the secondary of transformer 19 it will also be at a peak at point 21 on this secondary and, therefore, apply a positive voltage to the anodes of tube 164, the circuit being completed from the leads P', P''' at the cathode of tube 164 through the correspondingly lettered leads at the outer terminals of the secondary 33 of transformer 28, Figure 2, and from the mid-tap of this secondary to the point marked P" at the top of Figure 2 through condenser 165 to point P", Figure 2, thence to the point P", Figure 1, and to lead 47 back to the mid-tap 23 of transformer 19. The condenser 165 will be accordingly charged to the polarity indicated. At the instant that the positive peak of voltage appears at point 46 on the secondary of transformer 40 to fire the tube 126, or immediately prior thereto, a positive peak of voltage will appear at the point 55 on the secondary of peaking transformer 42 and be applied to the grid of tube 167 to overcome the negative bias thereon and cause the tube 167 to pass current and discharge the condenser 165 through the primary 56 of the open core spark coil 57 and through lead 58 to the opposite side of condenser 165. The current in the coil 56 will induce a voltage in the secondary 58 of the spark coil 57 and cause current to flow through tube 156 to leads T' and T''' connected to the filament of that tube, thence through the secondary 37 of transformer 28 to the mid-tap T" of that transformer and thence to the point T" of Figure 1 which is connected to the electrode holder 51 through the electrode 52, welding table 53, lead W, back to the lead marked W in Figure 2 and through lead 59 to the opposite side of secondary 58. This will apply a voltage across the electrode 52 and table 53 which will be at least several thousand volts and in a typical installation might reach 15,000 volts ionizing the gap between 52 and 53 and permitting the power surge of current from condenser 121 to pass through that gap, performing the welding operation.

Provided the switch 15, Figure 1, is opened, the cycle just described will be repeated, a surge of welding current flowing for each half cycle of current on the power leads 1, 2.

In the event the switch 15 is closed the magnet 14 will operate to connect point 38 to point 39 and point 60 to point 61 with the result that there will be a surge of welding current on each half cycle of voltage on the leads 1, 2. Operation of the contactor 16 completes a circuit for the tubes 125, 132, 164, 167 and 160 which is identical with the circuit already described for the tubes 126, 134, 164, 167 and 156. To perform the full wave welding mentioned, the steady negative bias upon the grid of tube 125 is supplied thereto across the leads B', B'', Figure 2, which are connected respectively to the leads B', B'', Figure 1. The steady negative bias for the grid of tube 132 is applied thereto across the leads D', D'', Figure 2, which are connected to the points D', D'', Figure 1. The steady negative bias for the grid of tube 167 is applied thereto across the points F', F'' connected to the rectifier at the bottom of Figure 2, the connection from F' being to the point F' connected to the secondary of the peaking transformer 42, Figure 1, thence through the secondary and to the point H, thence back to the point H, Figure 2.

The positive peak of voltage for the firing of the tube 125 is applied to the grid of that tube from the point 48 on the secondary of transformer 40 which is 180 electrical degrees later than the occurrence of the positive peak at the point 46 which actuates point 126. The positive peak of voltage from point 132 is applied to the tube 62 on the secondary of peaking transformer 41 and occurs 180 electrical degrees later than the positive peak occurs at point 49 which fires the tube 134. The positive peak of voltage is applied to the grid of tube 167 to fire this tube from the point 63 on the secondary of peaking transformer 42 which peak occurs 180 electrical degrees after the positive peak occurs at point 55 which fires the tube 167.

As before explained, the points U', U'', Figure 1, are connected to the points U', U'', Figure 2, and in addition to energizing the primary 27 of transformer 28 energize primary 64 of transformers 65 to 76 to operate the rectifier circuits connected to these secondaries. These rectifier circuits are conventional and need not be further described.

In order to be sure that my invention is clearly understood I will now briefly again run through the cycle of operation, considering a single full cycle of voltage across the secondary of power transformer 19:

At approximately 90 electrical degrees the tube 126 will fire and operate condenser 121. At the same time the condenser 165 will be charged. At approximately 270 electrical degrees the tubes 134 and 167 will fire, discharging the condenser 121 and the upper condenser 165, Figure 2, across the gap between electrode 52 and table 53.

At approximately 270 electrical degrees the tube 125 will fire, charging the condenser 122.

At the same time the condenser 165 will be charged.

At approximately 450 electrical degrees the tubes 132 and 167 will fire, discharging the condenser 122 and the lower condenser 165, Figure 2, across the gap between the electrode 52 and table 53 in the same direction in which the prior discharge occurred across this gap.

Referring to Figure 4 of my patent, No. 2,235,385, it will be seen that at the right of that figure I use two phase shifters in the circuit to charge the condensers 165. As these are connected to a three phase line they are necessarily rotary phase shifters and quite expensive. In the circuit of the present invention I avoid the necessity of using phase shifters by connecting anodes of the tube 164 to the secondary of the power transformer 19, thereby securing the proper time sequence without the necessity of any phase shifting. By using the three peaking transformers 40, 41 and 42 connected to the secondary of power transformer 19 and providing a simple resistance phase adjustment for each of them, namely, 43, 44 and 45, I avoid the necessity for any mechanical timing. However, by connecting these peaking transformers to the secondary of the power transformer I am able to employ a simple variable resistance inductance type of phase adjustment which is more economical and effective than would be possible if these peaking transformers were connected to the primary circuit as has been heretofore proposed.

It will be understood by those skilled in the art that my invention is capable of various modifications and I do not desire, therefore, to be restricted to the particular details shown and described but only within the scope of the appended claims.

What is claimed is:

1. An electric fusion welding circuit comprising a condenser, a power transformer, a controlled rectifier type of tube, means for charging said condenser through said tube, a peaking transformer for controlling the time of firing of said tube to charge said condenser, said peaking transformer being connected to the secondary of said power transformer.

2. An electric fusion welding circuit comprising a power condenser, a power transformer, a controlled rectifier type tube, means for charging said power condenser from the secondary of said transformer through said tube, a peaking transformer for controlling the time of firing said tube to charge said condenser, a work circuit, a second controlled rectifier type tube, means for discharging said condenser through said second tube and said work circuit, a second peaking transformer for controlling the time of firing of said second tube to control the time of discharging said condenser, a second condenser, means for charging said condenser, a third controlled rectifier type tube, means for firing said third tube to discharge said second condenser through said third tube to pass a high voltage spark through said work circuit, and a third peaking transformer for controlling the time of firing said third tube, said peaking transformers being energized from the secondary of said power transformer.

3. An electric fusion welding circuit comprising a power condenser, a power transformer, means for intermittently charging said power condenser from the secondary of said power transformer, a second condenser, said second condenser being an auxiliary condenser used for gap ionization, means for intermittently charging said second condenser from the secondary of said power transformer, a work circuit comprising a gap and work pieces to be joined, means for charging said condensers simultaneously, and means for discharging said condensers simultaneously through said work circuit.

4. An electric fusion welding circuit comprising a power condenser, an auxiliary condenser used for gap ionization, a power transformer, means for charging said condensers simultaneously from the secondary of said power transformer, a work circuit, means for discharging said condensers simultaneously through said work circuit, said last mentioned means comprising a pair of controlled rectifier type tubes and a pair of peaking transformers energized from the secondary of said power transformer to apply firing voltage simultaneously to said tubes.

5. An electric fusion welding circuit comprising a power condenser, an auxiliary condenser used for gap ionization, a power transformer, means for charging said condensers simultaneously from the secondary of said power transformer, a work circuit, means for discharging said condensers simultaneously through said work circuit, said last mentioned means comprising a pair of controlled rectifier type tubes and a pair of peaking transformers energized from the secondary of said power transformer to apply firing voltage simultaneously to the grids of said tubes, and a variable resistance connected in the circuit of each peaking transformer for adjusting the phase relationship of the peaked voltage produced thereby.

6. A welding circuit comprising a pair of condensers, one of said condensers being a power condenser and the other an auxiliary condenser used for gap ionization, a power transformer, means for charging said condensers from the secondary of said transformer on each positive half cycle of voltage current, a work circuit, means for discharging said condensers through said work circuit on each negative half cycle of voltage current, a second pair of condensers, one of said condensers being a power condenser and the other an auxiliary condenser used for gap ionization, means for charging said second pair of condensers from said secondary 180 electrical degrees after said first pair of condensers is charged, means for discharging said second pair of condensers through said work circuit 180 electrical degrees after said first pair of condensers is discharged, and switching apparatus for disconnecting the circuit connections to said second pair of condensers whereby said circuit is converted from full wave operation to half wave operation.

7. A welding system comprising a plurality of condensers in each of two groups, one group comprising power condensers and the other group auxiliary condensers used for gap ionization, a power transformer, means for charging said condensers from the secondary of said power transformer, a work circuit, means for discharging said condensers through said work circuit, a plurality of peaking transformers energized from the secondary of said power transformer, means for controlling the time of charging and discharging said condensers by said peaking transformers, and a variable resistance in the circuit of each peaking transformer for controlling the phase relationship of said charging and discharging of said condensers.

ALEXANDER RAVA.

REFERENCES CITED

The following references are of record in the file of this patent:

UNITED STATES PATENTS

| Number | Name | Date |
| --- | --- | --- |
| 1,168,346 | Thomson | Jan. 18, 1916 |
| 2,235,385 | Rava | Mar. 18, 1941 |
| 2,319,215 | Dawson | May 18, 1943 |
| 2,359,315 | Klemperer | Oct. 3, 1944 |
| 2,383,473 | Dawson et al. | Aug. 28, 1945 |
| 2,385,736 | Smith et al. | Sept. 25, 1945 |
| 2,394,535 | Dawson | Feb. 12, 1946 |

FOREIGN PATENTS

| Number | Country | Date |
| --- | --- | --- |
| 519,353 | Great Britain | Mar. 21, 1940 |
| 548,618 | Great Britain | Oct. 16, 1942 |